(12) United States Patent
Amano et al.

(10) Patent No.: US 12,105,201 B2
(45) Date of Patent: Oct. 1, 2024

(54) INFORMATION PROCESSING DEVICE

(71) Applicant: PIONEER CORPORATION, Tokyo (JP)

(72) Inventors: Katsumi Amano, Kawagoe (JP); Reiji Matsumoto, Kawagoe (JP); Kazuki Oyama, Kawagoe (JP); Naoto Norimatsu, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 892 days.

(21) Appl. No.: 17/271,186

(22) PCT Filed: Sep. 18, 2019

(86) PCT No.: PCT/JP2019/036476
§ 371 (c)(1),
(2) Date: Feb. 24, 2021

(87) PCT Pub. No.: WO2020/071117
PCT Pub. Date: Apr. 9, 2020

(65) Prior Publication Data
US 2021/0255326 A1    Aug. 19, 2021

(30) Foreign Application Priority Data

Oct. 1, 2018  (JP) .................................. 2018-186728

(51) Int. Cl.
*G01C 3/08*       (2006.01)
*G01S 17/58*      (2006.01)
(Continued)

(52) U.S. Cl.
CPC .............. *G01S 17/89* (2013.01); *G01S 17/58* (2013.01); *G01S 19/393* (2019.08); *G01S 19/40* (2013.01)

(58) Field of Classification Search
CPC ........ G01S 17/89; G01S 17/58; G01S 19/393; G01S 19/40
See application file for complete search history.

(56) References Cited

U.S. PATENT DOCUMENTS

2010/0091020 A1\* 4/2010 Kmiecik ................ G01C 21/28
345/582
2020/0318975 A1 10/2020 Yoshida

FOREIGN PATENT DOCUMENTS

JP      2010-507127 A    3/2010
JP      2013040886 A     2/2013
(Continued)

OTHER PUBLICATIONS

International Search Report and Written Opinion for related JP App. No. PCT/JP2019/036476 dated Oct. 29, 2018. English translation provided; 3 pages.

(Continued)

*Primary Examiner* — Mark Hellner
(74) *Attorney, Agent, or Firm* — PROCOPIO, CORY, HARGREAVES & SAVITCH LLP

(57) ABSTRACT

An information processing device includes a server device, wherein a point cloud integrating section acquires point cloud data, and a deviation amount calculating section acquires aerial photograph data with a bird's view on a ground surface from sky. Then, the deviation amount calculating section calculates deviation amounts between absolute positions on the aerial photograph data and absolute positions for point clouds included in the point cloud data, wherein the absolute positions on the aerial photograph data and for point clouds correspond to predetermined reference points and. A trajectory correcting section corrects a travelling trajectory extracted from the point cloud data by a trajectory extracting section, based on the deviation amounts calculated in the deviation amount calculating section, (Continued)

wherein the absolute positions for point clouds in the point cloud data are corrected based on the correction result of the trajectory correcting section.

17 Claims, 14 Drawing Sheets

(51) Int. Cl.
    *G01S 17/89*     (2020.01)
    *G01S 19/39*     (2010.01)
    *G01S 19/40*     (2010.01)

(56) References Cited

FOREIGN PATENT DOCUMENTS

| | | | |
|---|---|---|---|
| JP | 2013-171455 A | 9/2013 | |
| WO | WO 2017029886 A1 * | 2/2017 | ............... G06T 1/00 |
| WO | 2017208503 A1 | 12/2017 | |

OTHER PUBLICATIONS

Japanese Patent Office, Notice of Reasons for Refusal, JP Application No. 2020-550271, dated Feb. 8, 2022, in 10 pages.

* cited by examiner

INFORMATION PROCESSING DEVICE

CROSS-REFERENCE TO RELATED APPLICATIONS

This application is a U.S. National Stage entry of PCT Application No. PCT/JP2019/036476, filed on Sep. 18, 2019, which claims priority to JP Application No. 2018-186728, filed Oct. 1, 2018. The contents of the foregoing are incorporated by reference.

BACKGROUND OF THE INVENTION

Technical Field

The present invention relates to an information processing device configured to perform a predetermined process of point cloud information, wherein the point cloud information has been generated based on sensor information obtained by a sensor and based on information about an absolute position of a moving body at a time of acquiring the sensor information, the sensor being installed in the moving body.

Background Art

Recently, moving bodies such as vehicles have been developed which include a sensor installed therein, the moving bodies being configured to collect information about their surroundings. Information about a point cloud acquired by such a sensor may be utilized as a material for a high-precision map which is used for example in automated driving of a vehicle.

Here, the point cloud acquired by the sensor as described above often does not have a good accuracy with regard to their absolute positions, wherein corrections like position adjustment of the point cloud are made e.g. by means of a manual method. Thus, the corrections need time and costs, which makes the corrections inefficient.

In view of such a problem, for example Patent Document 1 discloses that a same travel path is travelled along at multiple times and a fixed object is selected as a reference point, the fixed object having its position remaining unchanged in point clouds resulting from each travel, wherein a post processing is performed for extending/reducing the point clouds so as to overlap the reference points with each other so that coordinate position data for a three-dimensional point cloud is calculated with a high accuracy.

CITATION LIST

Patent Literature

Patent Document 1: JP 2013-40886 A

SUMMARY OF THE INVENTION

Although the method according to Patent Document 1 can obtain point clouds with a high accuracy, due to the GPS (Global Positioning System) mainly used in the method, the accuracy for the GPS may be reduced e.g. in the case of many multipaths which are caused under the effect of surrounding buildings, which has room for improvement.

An example for objectives to be solved by the present invention is to correct the absolute position for the point cloud information in an efficient manner.

In order to achieve the objective, the invention according to claim 1 relates to an information processing device including: a point cloud information acquiring section configured to acquire point cloud information generated based on sensor information obtained by a sensor and based on information about an absolute position of a moving body at a time of acquiring the sensor information, the sensor being installed in the moving body: a bird's view information acquiring section configured to acquire bird's view information with a bird's view on a ground surface from sky: a calculating section configured to calculate a deviation amount between an absolute position for the bird's view information and an absolute position for a point cloud included in the point cloud information, wherein the absolute positions for the bird's view information and the point cloud correspond to a predefined reference point; and a correcting section configured to correct the absolute position for the point cloud included in the point cloud information based on the deviation amount calculated by the calculating section.

The invention according to claim 7 relates to an information processing method intended to be performed in an information processing device, the information processing device configured to perform predetermined processes, the information processing method including: a point cloud information acquiring step of acquiring point cloud information generated based on sensor information and information about an absolute position of a moving body at a time of acquiring the sensor information, wherein the sensor information is acquired by a sensor installed in the moving body: a bird's view information acquiring step of acquiring bird's view information with a bird's view on a ground surface from sky: a calculating step of calculating a deviation amount between an absolute position for the bird's view information and an absolute position for a point cloud included in the point cloud information, wherein the absolute positions for the bird's view information and the point cloud correspond to a predefined reference point; and a correcting step of correcting the absolute position for the point cloud included in the point cloud information based on the deviation amount calculated in the calculating step.

The invention according to claim 8 relates to an information processing program configured to cause a computer to perform the information processing method according to claim 7.

The invention according to claim 9 relates to a computer-readable medium including the information processing program according to claim 8 stored therein.

The invention according to claim 10 relates to an information processing device including: a sensor information acquiring section configured to acquire sensor information obtained by a sensor installed in a moving body: an absolute position information acquiring section configured to acquire information about an absolute position of the moving body at a time of acquiring the sensor information: a point cloud information generating section configured to generate point cloud information based on the sensor information and the information about the absolute position: a bird's view information acquiring section configured to acquire bird's view information with a bird's view on a ground surface from sky: a calculating section configured to calculate a deviation amount between an absolute position for the bird's view information and an absolute position for a point cloud included in the point cloud information, wherein the absolute positions for the bird's view information and the point cloud correspond to a predefined reference point; and a correcting section configured to correct the absolute position for the point cloud included in the point cloud information based on the deviation amount calculated by the calculating section.

The invention according to claim 11 relates to an information processing method intended to be performed in an information processing device, the information processing device configured to perform predetermined processes, the information processing method including: a sensor information acquiring step of acquiring sensor information obtained by a sensor installed in a moving body: an absolute position information acquiring step of acquiring information about an absolute position of the moving body at a time of acquiring the sensor information: a point cloud information generating step of generating point cloud information based on the sensor information and the information about the absolute position: a bird's view information acquiring step of acquiring bird's view information with a bird's view on a ground surface from sky: a calculating step of calculating a deviation amount between an absolute position for the bird's view information and an absolute position for a point cloud included in the point cloud information, wherein the absolute positions for the bird's view information and the point cloud correspond to a predefined reference point; and a correcting step of correcting the absolute position for the point cloud included in the point cloud information based on the deviation amount calculated in the calculating step.

The invention according to claim 12 relates to an information processing program configured to cause a computer to perform the information processing method according to claim 11.

The invention according to claim 13 relates to a computer-readable storage medium comprising the information processing program according to claim 12 stored therein.

DETAILED DESCRIPTION OF THE PREFERRED EMBODIMENTS

Figure 1:
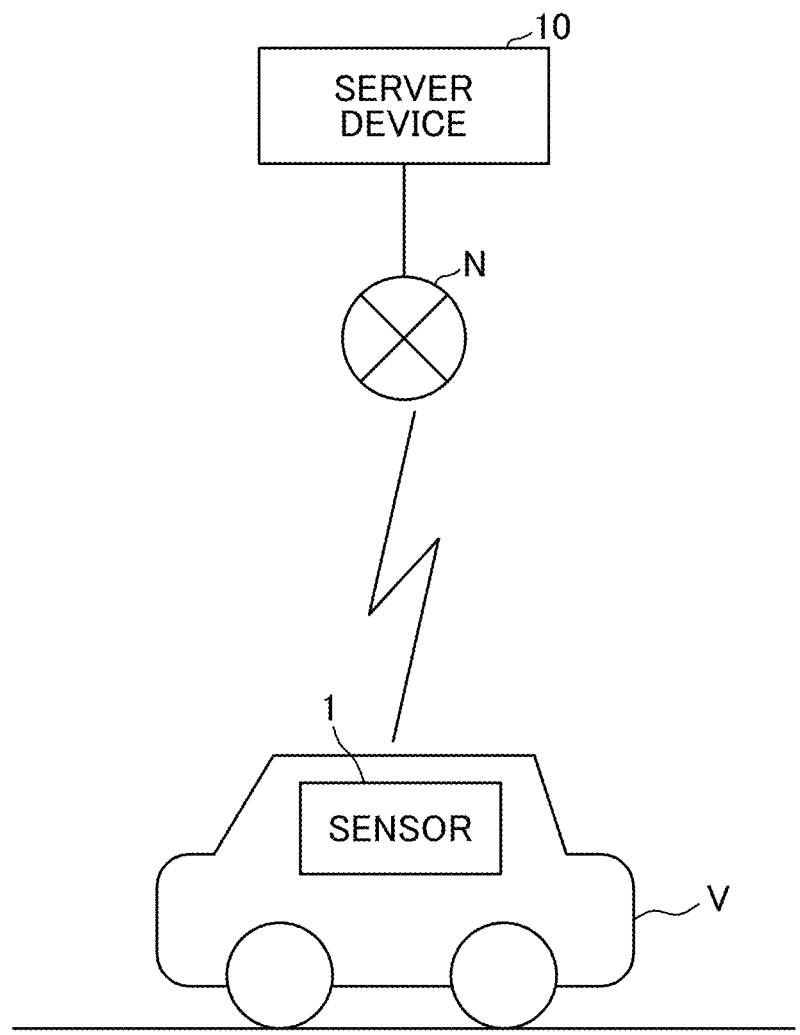
FIG. 1 is a schematic structural diagram of a system with an information processing device according to a first exemplary embodiment of the present invention.

Hereinafter, an information processing device according to an embodiment of the present invention. The information processing device according to an embodiment of the present invention is provided so that a point cloud information acquiring section acquires point cloud information generated based on sensor information obtained by a sensor and based on information about an absolute position of a moving body at a time of acquiring the sensor information, the sensor being installed in the moving body, and a bird's view information acquiring section acquires bird's view information with a bird's view on a ground surface from sky. Then, a calculating section calculates a deviation amount between an absolute position for the bird's view information and an absolute position for a point cloud included in the point cloud information, wherein the absolute positions for the bird's view information and the point cloud correspond to a predefined reference point; and a correcting section corrects the absolute position for the point cloud included in the point cloud information based on the deviation amount calculated by the calculating section. This enables the deviation amount of the absolute position for the reference point to be corrected by means of the bird's view information as a reference. Since e.g. an aerial photograph which already exists may be used as the bird's view information, it is not necessary to newly acquire high-precision data, which enables the absolute position for the point cloud information to be efficiently corrected.

Further, at least a position accuracy for the bird's view information associated with the reference point may be higher than a position accuracy for the absolute position represented by the information about the absolute position, the information about the absolute position being acquired for generating the point cloud information. This enables the absolute position for the point cloud information to be corrected by means of the bird's view information as a reference.

Furthermore, the point cloud information acquiring section may be configured to acquire a movement trajectory of the moving body at the time of acquiring the sensor information by the sensor as the information about the absolute position, and wherein the correcting section may be configured to correct the movement trajectory based on the deviation amount calculated by the calculating section. By correcting the movement trajectory, it is possible to correct the absolute position for the point cloud calculated based on the movement trajectory.

Further, the calculating section may be configured to calculate deviation amounts between a first reference point and a second reference point as two predefined reference points, absolute positions for the bird's view information corresponding to the first reference point and the second reference point, and absolute positions for the point clouds included in the point cloud information corresponding to the first reference point and the second reference point respectively, wherein the correcting section may be configured to correct a position for the point cloud information within a range between the first reference point and the second reference point based on the deviation amounts calculated by the calculating section. This enables the absolute positions for the point clouds between the two reference points to be corrected based on the deviation amounts for the two reference points.

The information processing device may further include a determining section configured to determine an accuracy of the absolute position for the point cloud information corrected by the correcting section, wherein if the accuracy of the absolute position determined by the determining section is lower than or equal to a predetermined accuracy, the calculating section may be configured to add a third reference point as a new reference point between the first reference point and the second reference point and to calculate a deviation amount between an absolute position for the bird's view information and an absolute position for the point cloud included in the point cloud information, wherein the absolute position for the bird's view information and the absolute position for the point cloud correspond to the third reference point, and wherein the correcting section may be configured to correct the absolute position for the point cloud based on the deviation amount between the absolute position for the bird's view information and the absolute position for the point cloud included in the point cloud information, wherein the absolute position for the bird's view information and the absolute position for the point cloud correspond to the third reference point calculated by the calculating section. In this manner, even when for example the deviation amount for the first and/or the second reference points is so large that a sufficient accuracy cannot be ensured by correction, a further correction can be performed for obtain a better accuracy.

The information processing device may further include a converting section configured to convert the point cloud information acquired by the point cloud information acquiring section into image information, wherein the bird's view information may be image information, wherein the bird's view information acquiring section may be configured to acquire image information with a predetermined range including the reference point for the bird's view information, and wherein the calculating section is configured to perform image matching between the image information with the predetermined range and the image information generated via conversion from the point cloud information in order to calculate the deviation amount between the absolute position for the bird's view information and the absolute position for the point cloud included in the point cloud information, the absolute positions for the bird's view information and the point cloud corresponding to the reference point. In this manner, by means of generally known image matching of the range including the reference point, it is possible not only to calculate deviations for the reference point in an x-direction and y-direction (or latitude and longitude), but also to calculate a deviation in a rotational angle, the x- and y-direction defining a horizontal axis and a vertical axis respectively.

An information processing method according to an embodiment of the present invention is provided so that in a point cloud information acquiring step, point cloud information is acquired which has been generated based on sensor information obtained by a sensor and based on information about an absolute position of a moving body at a time of acquiring the sensor information, the sensor being installed in the moving body, and in a bird's view information acquiring step, bird's view information with a bird's view on a ground surface from sky is acquired. Then, in a calculating step, a deviation amount between an absolute position for the bird's view information and an absolute position for a point cloud included in the point cloud information is calculated, wherein the absolute positions for the bird's view information and the point cloud correspond to a predefined reference point; and in a correcting step, the absolute position for the point cloud included in the point cloud information is corrected based on the deviation amount calculated in the calculating step. This enables the deviation amount of the absolute position for the reference point to be corrected by means of the bird's view information as a reference. Since e.g. an aerial photograph which already exists may be used as the bird's view information, it is not necessary to newly acquire high precision data, which enables the absolute position for the point cloud information to be efficiently corrected.

Further, an information processing program according to an embodiment of the present invention is configured to cause a computer to perform the information processing method as described above. This enables the deviation amount of the absolute position for the reference point to be corrected by means of the bird's view information as a reference by using a computer. Since e.g. an aerial photograph which already exists may be used as the bird's view information, it is not necessary to newly acquire high-precision data, which enables the absolute position for the point cloud information to be efficiently corrected.

Furthermore, the information processing program as described above may be stored in a computer-readable storage medium. In addition to integrating the program into an equipment, this enables the program to be available on market for itself and to be easily upgraded in its version, for example.

Further, an information processing device according to another embodiment of the present invention is provided so that a sensor information acquiring section acquires sensor information obtained by a sensor installed in a moving body, an absolute position information acquiring section acquires information about an absolute position of the moving body at a time of acquiring the sensor information, a point cloud information generating section generates point cloud information based on the sensor information and the information about the absolute position, and a bird's view information acquiring section acquires bird's view information with a bird's view on a ground surface from sky. Then, a calculating section calculates a deviation amount between an absolute position for the bird's view information and an absolute position for a point cloud included in the point cloud information, wherein the absolute positions for the bird's view information and the point cloud correspond to a predefined reference point; and a correcting section corrects the absolute position for the point cloud included in the point cloud information based on the deviation amount calculated by the calculating section. This enables the deviation amount of the absolute position for the reference point to be corrected by means of the bird's view information as a reference. Since e.g. an aerial photograph which already exists may be used as the bird's view information, it is not necessary to newly acquire high-precision data, which enables the absolute position for the point cloud information to be efficiently corrected. Furthermore, it may be configured so that the process of generating the point cloud information is not performed in one unit, but in separate units, wherein the process may be divided e.g. on the moving body such as a vehicle and on a server device.

Moreover, an information processing method according to another embodiment of the present invention is provided so that in a sensor information acquiring step, sensor information is acquired which has been obtained by a sensor installed in a moving body, in an absolute position information acquiring step, information about an absolute position of the moving body at a time of acquiring the sensor information is acquired, in a point cloud generating step, point cloud information is generated based on the sensor information and the information about the absolute position, and in a bird's view information acquiring step, bird's view information with a bird's view on a ground surface from sky is acquired. Then, in a calculating step, a deviation amount between an absolute position for the bird's view information and an absolute position for a point cloud included in the point cloud information is calculated, wherein the absolute positions for the bird's view information and the point cloud correspond to a predefined reference point; and in a correcting step, the absolute position for the point cloud included in the point cloud information is corrected based on the deviation amount calculated in the calculating step. This enables the deviation amount of the absolute position for the reference point to be corrected by means of the bird's view information as a reference. Since e.g. an aerial photograph which already exists may be used as the bird's view information, it is not necessary to newly acquire high-precision data, which enables the absolute position for the point cloud information to be efficiently corrected. Furthermore, it may be configured so that the process of generating the point cloud information is not performed in one unit, but in separate units, wherein the process may be divided e.g. on the moving body such as a vehicle and on a server device.

Moreover, the information processing method is performed by a computer. This enables the deviation amount of the absolute position for the reference point to be corrected by means of the bird's view information as a reference by using a computer. Since e.g. an aerial photograph which already exists may be used as the bird's view information, it is not necessary to newly acquire high-precision data, which enables the absolute position for the point cloud information to be efficiently corrected. Furthermore, it may be configured so that the process of generating the point cloud information is not performed in one unit, but in separate units, wherein the process may be divided e.g. on the moving body such as a vehicle and on a server device.

Furthermore, the information processing program may be stored in a computer-readable storage medium. In addition to integrating the program into an equipment, this enables the program to be available on market for itself and to be easily upgraded in its version, for example.

Exemplary Embodiment 1

An information processing device according to a first exemplary embodiment of the present invention will be described with reference to FIGS. 1 to 8. In FIG. 1, the information processing device according to the present exemplary embodiment is configured as a server device 10. The server device 10 acquires data (information) obtained by a sensor 1 via a network N such as internet, the sensor 1 being installed in a vehicle V as a moving body, wherein the server device 10 then corrects position information (absolute position) for a point cloud included in the data based on an aerial photograph as described below.

The sensor 1 includes a LIDAR (Light Detection and Ranging) and/or GPS receiver etc. It is to be noted that the sensor 1 may include an in-vehicle camera which images the surroundings of the vehicle, such as its front side.

The LiDAR is configured to emit a laser light as an electromagnetic wave in order to measure a distance from an object in the external environment in a discrete manner. The LiDAR outputs a pulsed laser with a varying output direction within a predetermined detected region, wherein the LiDAR receives a reflected wave of the laser and generates sensor information. The LiDAR outputs a laser with multiple pulses within the detected region and generates a point cloud based on the reflected wave of this laser with the multiple pulses. As sensor data, each of points which form the point cloud at this time includes information representative of the output direction of the laser, the distance from the object which has reflected the laser, and an intensity of the reflected wave (reflection intensity).

The GPS receiver receives radio waves at regular intervals, the radio waves being transmitted by multiple GPS satellites in a known manner, wherein the GPS receiver determines the current position information (latitude and longitude) and time. This means that the current position information represents an absolute position of the vehicle V. For determining the absolute position, it is possible to use not only the GPS receiver, but also other sensors or others, such as an IMU (inertial measurement unit). Then, the data for this absolute position is associated with the above-mentioned sensor data, wherein these data are transmitted to the server device 10.

Figure 2:
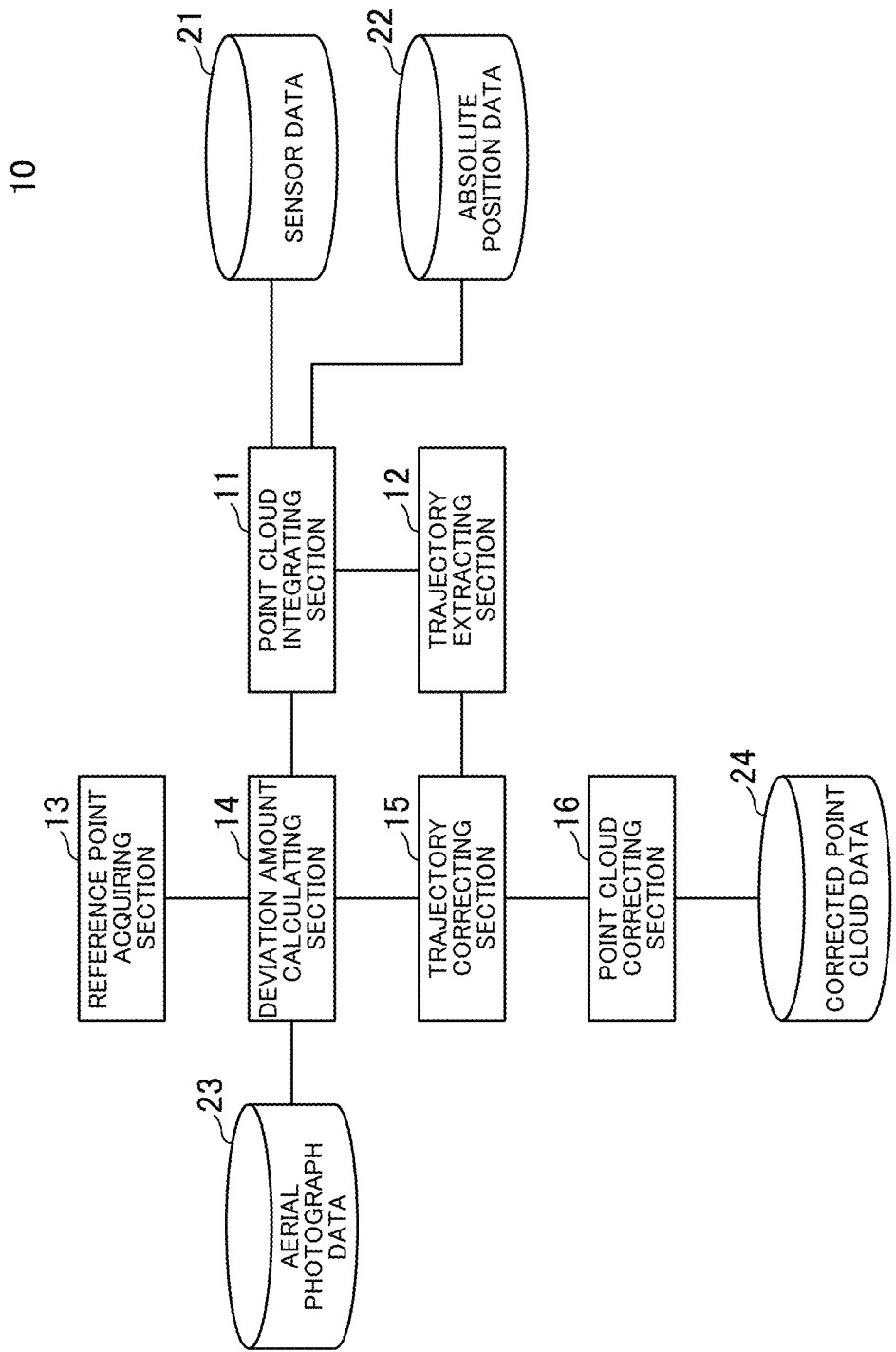
FIG. 2 is a functional diagram of a server device according to FIG. 1.

FIG. 2 shows a functional diagram of the server device 10. The server device 10 includes a point cloud integrating section 11, a trajectory extracting section 12, a reference point acquiring section 13, a deviation amount calculating section 14, a trajectory correcting section 15, and a point cloud correcting section 16. These functions are carried out by executing a program (information processing program) in a CPU provided in the server device 10, wherein the program is stored in a storage device provided in the server device 10, such as a hard disk.

The server device 10 further stores the sensor data 21, absolute position data 22, aerial photograph data 23, corrected point cloud data 24. These data are stored in the storage device provided in the server device 10, such as a hard disk. The sensor data 21 and absolute position data 22 are transmitted from the sensor 1. This means that the sensor data 21 is sensor information, and the absolute position data is information about the absolute position. Each of the sensor data 21 is associated with an absolute position data 22 for an absolute position at which the sensor data 21 has been acquired. These data may not only be acquired directly from the sensor 1, but also may be acquired from another server device or others outside the server device 10.

The aerial photograph data 23 is a photographic data acquired by imaging a ground surface in a bird's perspective by a camera from a flying object such as an airplane. It is possible not only to use aerial photographs, but also use data of the point cloud obtained by a satellite photograph and/or airborne LiDAR (the ground surface is irradiated with a laser light from a LiDAR installed in a flying object such as an airplane). Accordingly, the aerial photograph data 23 forms bird's view information.

The corrected point cloud data 24 is point cloud data obtained by correcting the absolute position in the point cloud correcting section 16 as described below (i.e. data with a point cloud which has a position in the form of an absolute position). Accordingly, the point cloud data forms point cloud information.

First, the point cloud integrating section 11 determines the absolute position(s) for the point cloud obtained by the LiDAR based on the sensor data 21 and the absolute position data 22 in order to generate and acquire the point cloud data which is formed from the absolute position(s) for the point cloud. This means that the point cloud integrating section 11 functions as a point cloud information acquiring section which acquires the point cloud data. The point cloud integrating section 11 further integrates point cloud data for multiple travels obtained by driving the vehicle V on a same path at multiple times. For example for travelling trajectories of the vehicle V resulting from its absolute positions and for the corresponding point clouds, it is conceivable to select a representative one of trajectories and point clouds for multiple travels or to average the trajectories for multiple travels and the corresponding point clouds in order to integrate the point cloud data. For integrating the point cloud data for multiple travels, a method such as ICP (Iterative Closest Point) is used at common positions included in integrated point clouds in order to prevent inconsistency for the point clouds. In the present exemplary embodiment, the following process may be performed based on point cloud data obtained from one travel instead of multiple travels: in case of the point cloud data obtained from one travel, the integration as described above may be omitted.

The trajectory extracting section 12 extracts (generates) a travelling trajectory (movement trajectory) of the vehicle V based on the absolute position data obtained by the point cloud integrating section 11. This means that the trajectory extracting section 12 functions as a part of the point cloud information acquiring section which extracts (acquires) the travelling trajectory as the information about the absolute position.

The reference point acquiring section 13 acquires data representative of a reference point as described below. It is to be noted that the data representative of the reference point may be acquired from the outside and/or by generating the data representative of the reference point by the reference point acquiring section 13 itself based on the aerial photograph data 23. Additionally or alternatively, the data representative of the reference point may be manually defined by an operator or other e.g. with reference to an aerial photograph. The reference point is a position used as a reference for calculating a deviation amount between the point cloud data and the aerial photograph data 23 in the deviation amount calculating section 14, as described below in details. The reference point may be defined as a characteristic spot on a map, such as a center of an intersection or a corner of an intersection (a point at which lines intersect each other, the lines indicative of ends of intersecting roads in a width direction).

Based on the point cloud data integrated by the point cloud integrating section 11, the data representative of the reference point obtained by the reference point acquiring section 13 and the aerial photograph data 23, the deviation amount calculating section 14 calculates a deviation amount between the aerial photograph data 23 and the point cloud data at the reference point. The calculation of the deviation amount will be described below in details. The deviation amount calculating section 14 functions as a bird's view information acquiring section which acquires bird's view information.

The trajectory correcting section 15 corrects the travelling trajectory extracted by the trajectory extracting section 12, based on the deviation amount calculated by the deviation amount calculating section 14.

The point cloud correcting section 16 corrects the absolute position for the point cloud data generated by the point cloud integrating section 11, based on the travelling trajectory corrected by the trajectory correcting section 15, in order to generate the corrected point cloud data 24. It is to be noted that the corrected point cloud data 24 may include the travelling trajectory corrected by the trajectory correcting section 15.

Figure 3:
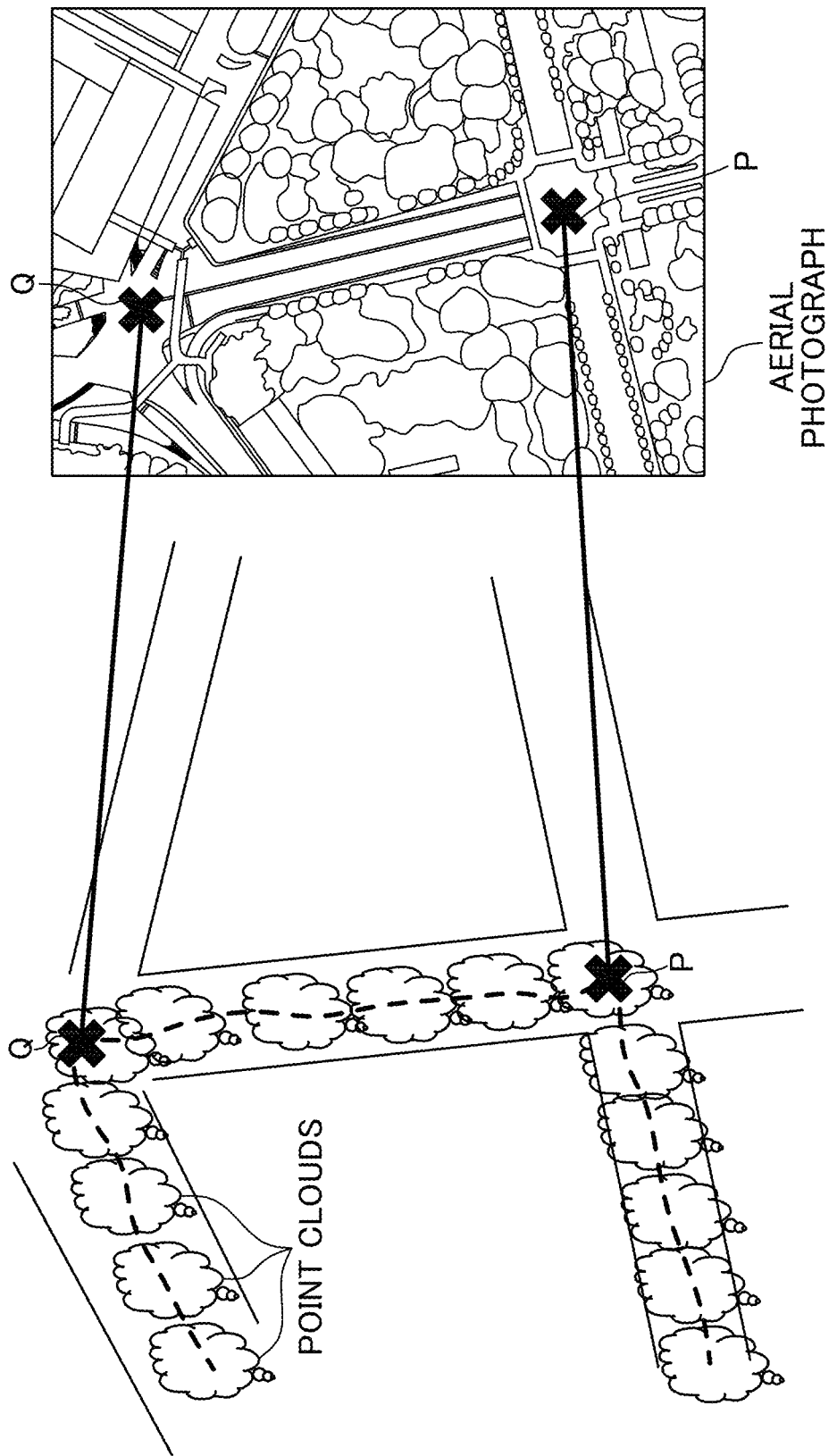
FIG. 3 is an explanatory illustration of a correction process of point cloud data in the server device according to FIG. 2.

Next, a correction process of the point cloud data performed in the server device 10 with the above-described configuration will be described with reference to FIG. 3. FIG. 3 shows, on the left side, the sensor data 21 (point cloud) acquired on a path on which the vehicle V has travelled, and the travelling trajectory (indicated by a dashed line in FIG. 3) of the vehicle V based on the absolute position data 22. On the right side, FIG. 3 further shows an aerial photograph corresponding to a range of the left side of FIG. 3.

Here, the absolute position of the point cloud data may have a reduced accuracy for position measurement e.g. due to the effect of multipaths of the GPS. On the other hand, the aerial photograph may have a higher position accuracy associated to the reference point than the measurement accuracy of the GPS. The present exemplary embodiment utilizes such an aerial photograph having a higher position accuracy than the absolute position for the point cloud data. An example of the aerial photograph data is Geospatial Information Authority map (air-to-ground photograph) provided by the Geospatial Information Authority of Japan. It is sufficient if the aerial photograph has a better position accuracy at least for the reference point than the absolute position acquired by the sensor 1.

In the Figure, P and Q indicate reference points. According to the left side of FIG. 3, absolute positions (latitudes and longitudes) of the reference points P and Q may be determined from the absolute positions of point clouds included in the point cloud data, wherein the point clouds correspond to the reference points. On the right side (aerial photograph), FIG. 3 shows an image with position information such as Geo TIFF which includes latitudes and longitudes of four corners of the photograph. If for such an image with position information, the precision (resolution) is known in advance, the absolute positions (latitudes and longitudes) for the reference points P and Q can be determined from these informations.

Then, the deviation amount calculating section 14 determines differences (deviation amounts) for the absolute positions of the calculated reference points P and Q. This means that deviation amount calculating section 14 functions as a calculating section which calculates deviation amounts between the reference point P (first reference point) and reference point Q (second reference point) as two predefined reference points, the absolute positions for the aerial photograph data 23 (bird's view information) corresponding to the reference point P (first reference point) and reference point Q (second reference point) respectively, and the absolute positions for the point clouds included in the point cloud data (point cloud information) corresponding to the reference point P (first reference point) and reference point Q (second reference point) respectively.

Then, the trajectory correcting section 15 corrects the travelling trajectory between the reference points P and Q based on the deviation amounts, wherein the point cloud correcting section 16 corrects the absolute positions for the sensor information (point cloud) based on the correction result of the travelling trajectory. This means that the trajectory correcting section 15 and the point cloud correcting section 16 function as a correcting section which corrects the position of the point cloud information within a range between the reference point P (first reference point) and the reference point Q (second reference point) based on the deviation amounts calculated by the deviation amount calculating section 14 (calculating section).

Figure 4:
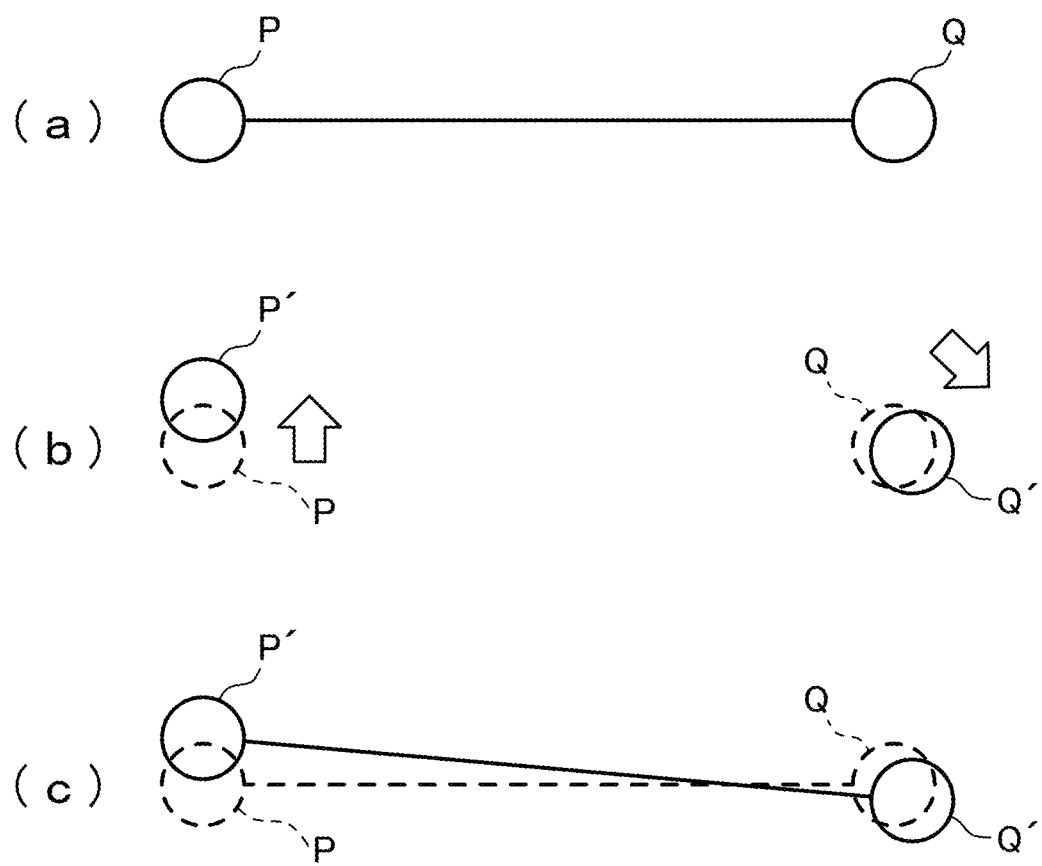
FIG. 4 is an explanatory illustration of a correction process of a travelling trajectory in a trajectory correcting section according to FIG. 2.

The correction of the travelling trajectory based on the reference points will be described with reference to FIG. 4. For the absolute positions for the reference points P and Q acquired from the sensor data 21 and the absolute position data 22 (FIG. 4(*a*)), deviation amounts from absolute positions of reference points P' and Q' are calculated (FIG. 4(*b*)), the reference points P' and Q' being calculated from the aerial photograph data 23. Then, under the assumption that the reference points P and Q were displaced to the reference points P' and Q', the travelling trajectory between the reference points P and Q is corrected e.g. via linear interpolation or nonlinear interpolation (FIG. 4(*c*)). In FIG. 4(*c*), the solid line and the dashed line indicate the corrected travelling trajectory and the travelling trajectory before correction, respectively.

Figure 5:
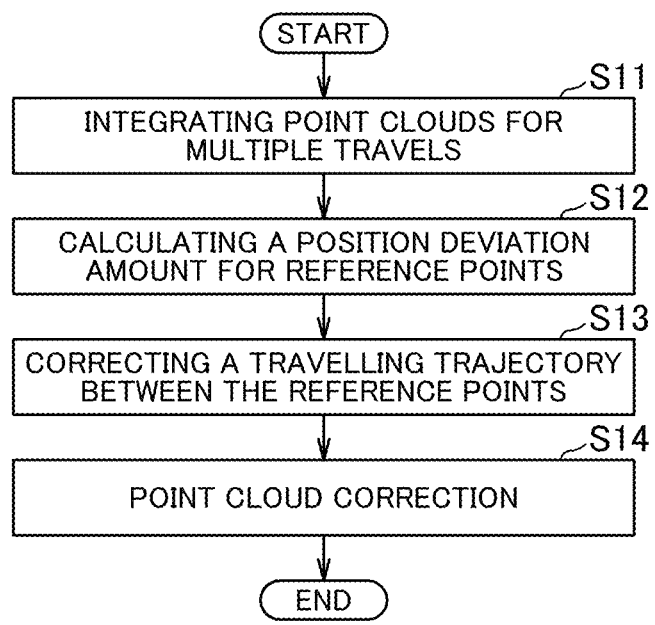
FIG. 5 is a flowchart of an information processing method in the server device according to FIG. 2.

Next, the operation of the server device 10 as described above (information processing method) will be described with reference to a flowchart in FIG. 5. First, the point cloud data for multiple travels are integrated from the sensor data 21 and the absolute position data 22 in the point cloud integrating section 11 (step S11). Next, deviation amounts of the absolute positions for the reference points are calculated in the deviation amount calculating section 14 (step S12). Next, the correction of the travelling trajectory between the reference points is performed in the trajectory correcting section 15 (step S13). Then, the correction of the point cloud is performed in the point cloud correcting section 16 (step S14).

This means that the steps S11 and S12 function as a point cloud information acquiring step and a calculating step, respectively, wherein the step S13 and S14 function as a correcting step.

Although from the viewpoint of constraint conditions for the corrections, it is preferable to define two reference points as described above, one reference point may be used. In case of one reference point, only a deviation amount for this one reference point is necessary as a correction amount in order to correct the travelling trajectory. This means that the deviation amount calculating section 14 needs to calculate only a deviation amount between an absolute position for the aerial photograph data 23 (bird's view information) and an absolute position for the point cloud included in the point cloud data (point cloud information), wherein the absolute positions for the aerial photograph data 23 and for the point cloud correspond to the predefined reference point. Then, the trajectory correcting section 15 and point cloud correcting section 16 only need to correct the absolute position for the point cloud included in the point cloud data (point cloud information), based on the deviation amount calculated by the deviation amount calculating section 14 (calculating section).

Furthermore, the reference point is preferably used only for the correction of the point cloud which is involved in the calculation of the deviation amount for the reference point. For example, in case of FIG. 3, if the point clouds used for the deviation amount calculation for the reference points P and Q have been acquired by different vehicles, the correction between the reference points P and Q (e.g. linear interpolation) is not performed. This is because if the sensor informations have been acquired by different vehicles, the sensors themselves such as LiDARs may have different performances and/or may be mounted under different conditions, which may have resulted in an error between the data. In this case, the correction with one reference point as described above is performed, or the correction is performed based on another reference point included in the point cloud data which has been acquired by the same vehicle.

In the server device 10 according to the present exemplary embodiment, the point cloud integrating section 11 acquires the point cloud data generated based on the sensor data and the absolute position data of the vehicle V at the time of acquiring the sensor data, wherein the sensor data has been obtained by a sensor 1 installed in the vehicle V. Then, the deviation amount calculating section 14 acquires the aerial photograph data with a bird's view on the ground surface from sky, and calculates the deviation amount between the absolute positions on the aerial photograph data and the absolute positions for the point cloud included in the point cloud data, wherein the absolute positions on the aerial photograph data and for the point cloud correspond to the predefined reference points P and Q. Then, the trajectory correcting section 15 corrects the travelling trajectory extracted from the point cloud data by the trajectory extracting section 12, based on the deviation amount calculated by the deviation amount calculating section 14, wherein the absolute position for the point cloud of the point cloud data is corrected based on the correction result of the trajectory correcting section 15. This enables the deviation amounts of the absolute positions for the reference points P and Q to be corrected by means of the aerial photograph data as a reference. In this manner, e.g. an aerial photograph which already exists may be used, so that it is not necessary to newly acquire high-precision data, which enables the absolute position for the point cloud information to be efficiently corrected.

Further, since the trajectory correcting section 15 corrects the travelling trajectory based on the deviation amount calculated by the deviation amount calculating section 14, the absolute position for the point cloud can be corrected which is calculated based on the travelling trajectory.

Furthermore, since the deviation amount calculating section 14 calculates the deviation amounts between the absolute positions on the aerial photograph and the absolute positions for the point clouds included in the point cloud data, wherein the absolute positions on the aerial photograph and for the point cloud correspond to the two reference points P and Q respectively, the trajectory correcting section 15 then corrects the travelling trajectory extracted from the point cloud data by the trajectory extracting section 12, based on the deviation amounts calculated by the deviation amount calculating section 14, and the absolute position for the point cloud of the point cloud data is corrected based on the correction result of the trajectory correcting section 15, it is possible to correct the absolute position for the point cloud between the two reference points based on the deviation amounts for the two reference points.

Furthermore, at least the position accuracy for the aerial photograph associated with the reference point is higher than the position accuracy for the absolute position acquired for generating the point cloud data. This enables the absolute position for the point cloud information to be corrected by means of the aerial photograph as a reference.

Exemplary Embodiment 2

Next, an information processing device according to a second exemplary embodiment of the present invention will be described with reference to FIGS. 6 and 7. Here, for the same parts as those in the first exemplary embodiment, the same reference signs are used and the corresponding description will be omitted.

Figure 6:
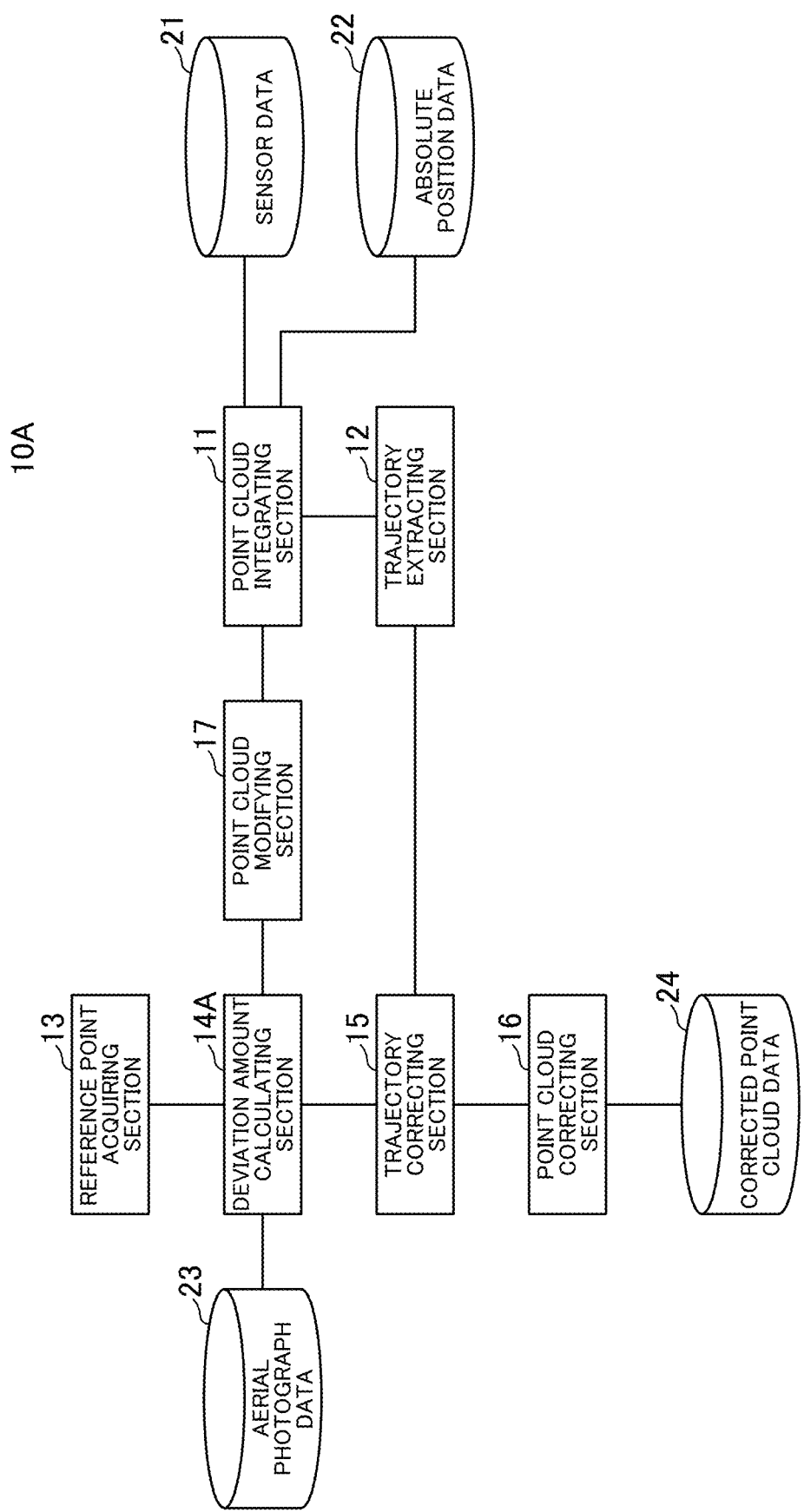
FIG. 6 is a functional diagram of a server device according to a second exemplary embodiment of the present invention.

FIG. 6 shows a functional diagram of a server device 10A as the information processing device according to the present exemplary embodiment. The server device 10A according to FIG. 6 additionally includes a point cloud modifying section 17. Further, the deviation amount calculating section 14 is replaced with a deviation amount calculating section 14A.

The point cloud modifying section 17 converts the point cloud data generated by the point cloud integrating section 11, into two-dimensional image data with a bird's view from sky. This means that the point cloud modifying section 17 functions as a converting section which is configured to convert the point cloud data (point cloud information) into image information.

The deviation amount calculating section 14A performs an image adjustment for the aerial photograph data 23 and the two-dimensional image data converted by the point cloud modifying section 17, such as edge extraction and blur processing, and thereafter image template matching as generally known. A deviation amount between the point cloud data (two-dimensional image data) and the aerial photograph data 23 for a reference point is calculated, wherein the reference point is set e.g. as a center position of a range which has been determined as matching by the image template matching. The process in the deviation amount calculating section 14A will be described with reference to FIG. 7.

Figure 7:
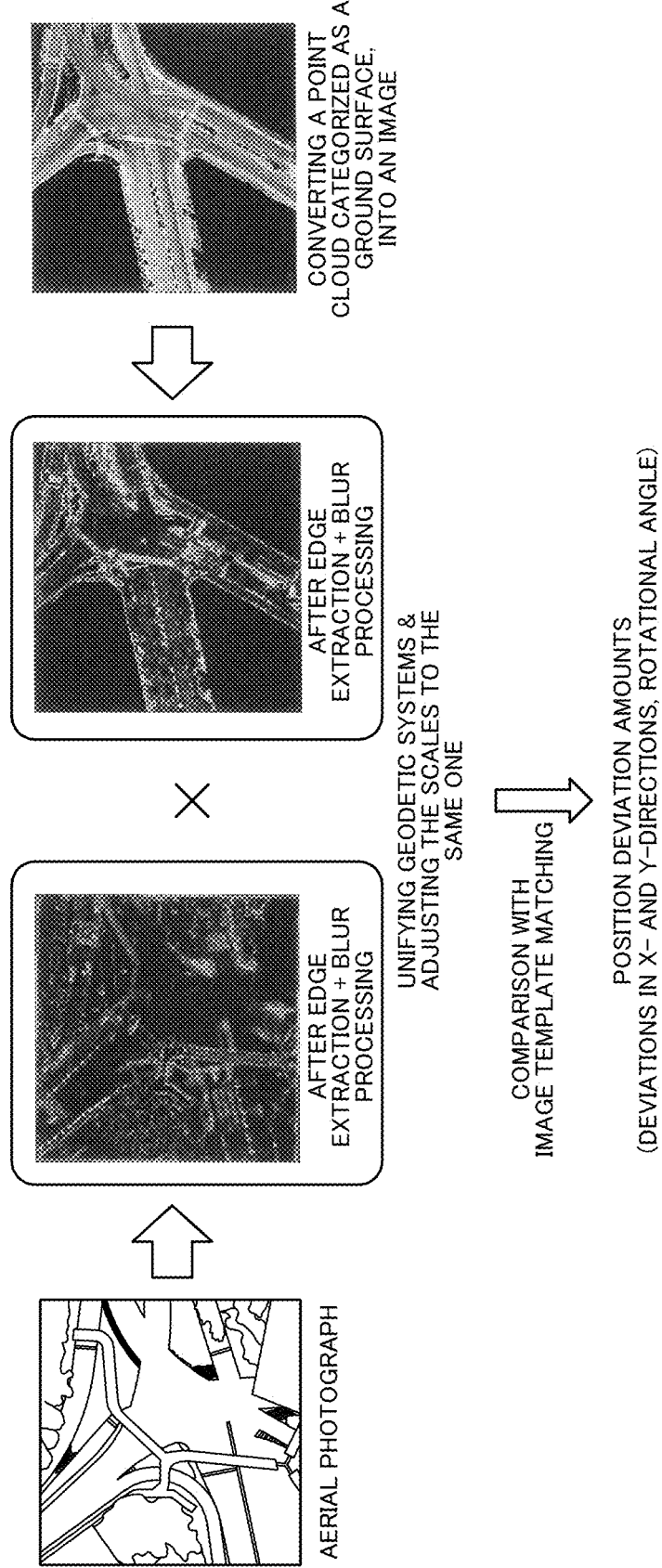
FIG. 7 is an explanatory illustration of operation in a deviation amount calculating section according to FIG. 6.

FIG. 7 shows an aerial photograph at the left end. Similarly to the first exemplary embodiment, absolute positions of its four corners and a resolution are known in advance for the aerial photograph. I.e., the aerial photograph represents image information for a predetermined range which includes a reference point of the bird's view information. The second image from the left in FIG. 7 shows an image of the aerial photograph to which the edge extraction and the blur processing have been applied.

At the right end, FIG. 7 shows a two-dimensional image data which has been converted from the point cloud data. The present example shows that the point cloud which have been categorized as a ground surface is converted into an image, however, another method can be also used, such as extracting and converting a point cloud into an image, the point cloud being located at a certain height from a road ground surface. The second image from the right in FIG. 7 shows an image of the two-dimensional image data at the right end to which the edge extraction and the blur processing have been applied.

Then, geodetic systems are unified for the images of the aerial photograph and the two-dimensional image data to which the edge extraction and the blur processing have been applied, wherein their scales are adjusted to the same scale and a comparison is performed via template matching e.g. by means of the image of the aerial photograph as a template image. Then, a deviation amount (e.g. deviation in vertical and horizontal directions, rotational angle) is determined for the reference point which has been set within the range of the image determined as matching.

This means that the deviation amount calculating section 14A (calculating section) performs template matching (image matching) between the aerial photograph data 23 (image information with a predetermined range) and the image information generated via conversion of the point cloud data (point cloud information) in order to calculate the deviation amount between the absolute position for the aerial photograph data 23 (bird's view information) and the absolute position for the point cloud included in the point cloud data (point cloud information), the absolute positions for the aerial photograph data 23 and the point cloud corresponding to the reference point.

Such image template matching is performed at two points. This means that, should the image template matching as described above correspond e.g. to calculating the deviation amount for the reference point Q according to FIG. 3, it is possible to perform the correction in a similar manner as the correction of the travelling trajectory between the reference points P and Q as described with reference to the first exemplary embodiment by applying the image template matching to the aerial photograph associated with the reference point P and to the image generated via conversion of the point cloud data into a two-dimensional image data.

The present exemplary embodiment provides the point cloud modifying section 17 which converts the point cloud data generated by the point cloud integrating section 11 into a two-dimensional image. Further, the deviation amount calculating section 14A acquires image with a predetermined range including the reference point of the aerial photograph data 23, and performs image matching between the image with the predetermined range and the two-dimensional image generated via conversion of the point cloud data in order to calculate the deviation amount between the absolute position for the aerial photograph and the absolute position for the point cloud included in the point cloud data, the absolute positions for the aerial photograph and the point cloud corresponding to the reference point. In this manner, by means of generally known image matching of the range including the reference point, it is possible not only to calculate deviations for the reference point in vertical and horizontal direction (latitude and longitude), but also to calculate a deviation in a rotational angle.

Exemplary Embodiment 3

Next, an information processing device according to a third exemplary embodiment of the present invention will be described with reference to FIGS. 8 and 9. Here, for the same parts as those in the first and second exemplary embodiments, the same reference signs are used and the corresponding description will be omitted.

Figure 8:
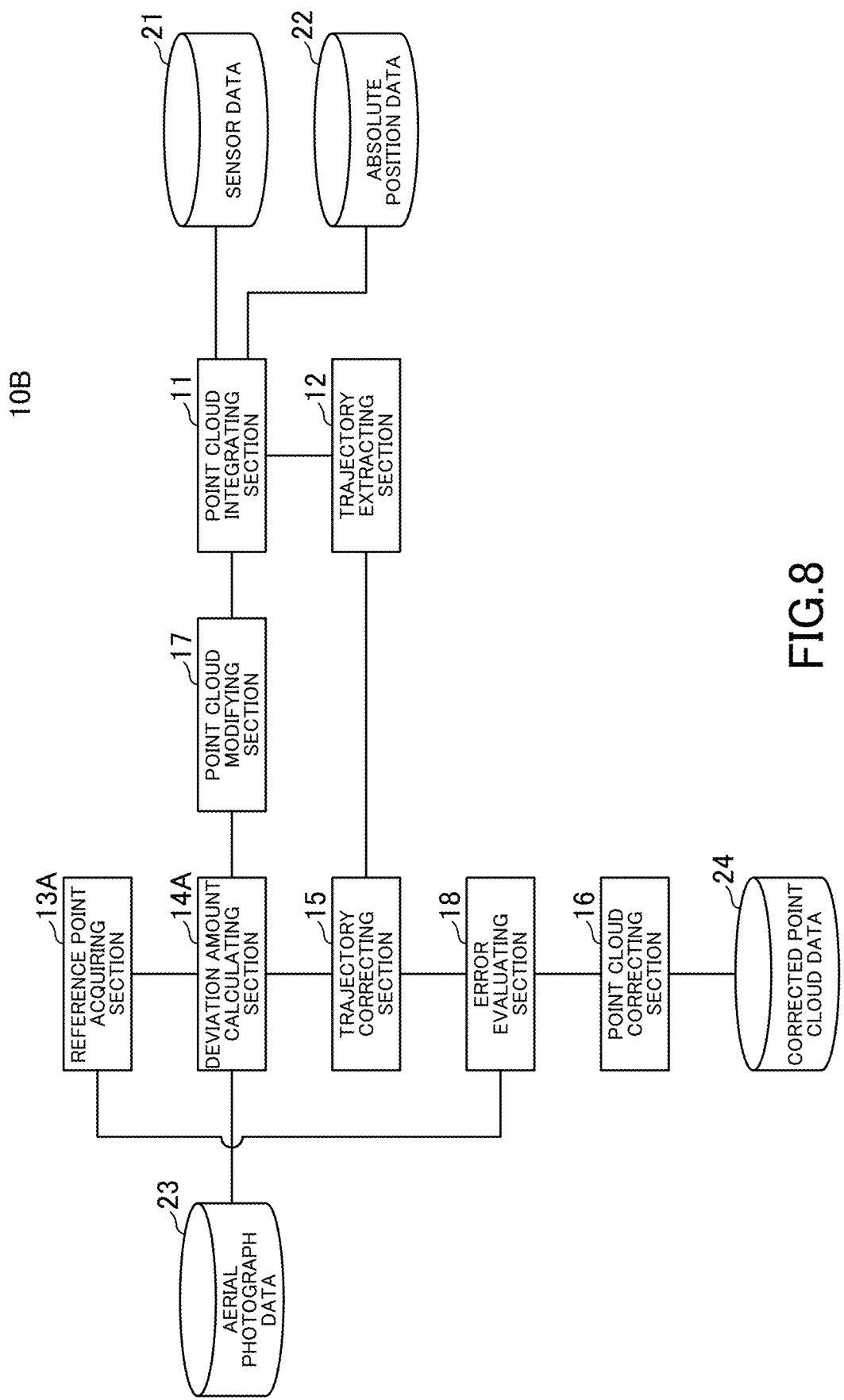
FIG. 8 is a functional diagram of a server device according to a third exemplary embodiment of the present invention.

FIG. 8 shows a functional diagram of a server device 10B as the information processing device according to the present exemplary embodiment. The server device 10B according to FIG. 8 is configured by adding an error evaluating section 18 to that of FIG. 6. Further, the reference point acquiring section 13 is replaced with a reference point acquiring section 13A. Although the configuration according to FIG. 8 is based on that of FIG. 6, it may be based on the configuration according to FIG. 2.

The error evaluating section 18 evaluates (determines) an error (accuracy) of the travelling trajectory which has been corrected by the trajectory correcting section 15. In details, the evaluation may be performed for example with regard to the following cases: an incorrect absolute position such as the corrected travelling trajectory being located above a building, and/or a deviation between the travelling trajectory before correction and the corrected travelling trajectory which is larger than or equal to a predetermined threshold. According to the present exemplary embodiment, these cases are defined as cases where an accuracy of an absolute position is lower than or equal to a predetermined accuracy. Accordingly, the error evaluating section 18 functions a determining section which determines the accuracy of the absolute position for the point cloud data (point cloud information) corrected by the trajectory correcting section 15 and point cloud correcting section 16 (correcting section).

Then, if the evaluation shows that the absolute position is abnormal and/or the error is larger than a predetermined threshold, i.e. the accuracy of the absolute position is lower than or equal to the predetermined accuracy, the reference point acquiring section 13A is instructed to acquire a new reference point as described below. This means that a third reference point is added. Further, if the error is smaller than the threshold, no new reference point is added, wherein the absolute position for the point cloud is corrected based on the corrected travelling trajectory in the point cloud correcting section 16 in a similar manner as the first and second exemplary embodiments.

In addition to acquisition of the reference points as described above with the first exemplary embodiment, the reference point acquiring section 13A acquires a new reference point in response to instructions of the error evaluating section 18. The new reference point will be described with reference to FIG. 9.

Figure 9:
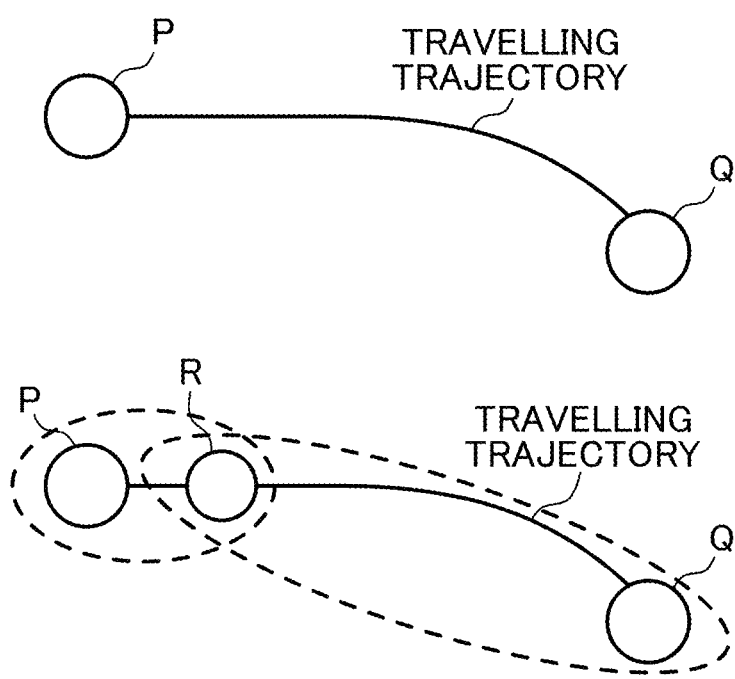
FIG. 9 is an explanatory illustration of a new reference point.

An upper part of FIG. 9 shows a reference point P, a reference point Q, and a travelling trajectory which provides connection between the reference points P and Q. In this case, if the evaluation by the error evaluating section 18 shows that the travelling trajectory corrected by the trajectory correcting section 15 has e.g. an error which is larger than the predetermined threshold, a new reference point R is defined on the travelling trajectory between the reference points P and Q. This reference point R will be the third reference point. Then, the deviation amount calculating section 14A calculates a deviation amount between an absolute position for the aerial photograph and an absolute position for the point cloud included in the point cloud data, wherein the absolute position for the bird's view information and the absolute position for the point cloud correspond to the reference point R.

Then, the travelling trajectory between the reference points P and R is corrected by the trajectory correcting section 15 based on the deviation amount for the calculated reference point R and the deviation amount for the previously calculated reference point P, in a similar manner as the first exemplary embodiment, and the travelling trajectory between the reference points R and Q is corrected by the trajectory correcting section 15 in a similar manner as the first exemplary embodiment. Then, the error evaluation is performed for the re-corrected travelling trajectory, wherein a new reference point is defined recursively until the error is lower than or equal to the threshold (e.g. a new reference point is defined between P and R).

It is to be noted that the new reference point is not defined on the corrected travelling trajectory, but on the travelling trajectory before correction. Furthermore, a position for defining the new reference point may be for example a middle point between two reference points, a curve and/or a corner (geomorphological inflection point), a position which reflects a weight depending on the reliability of the reference point, for example.

The present exemplary embodiment further provides the error evaluating section 18 configured to evaluate an error of the travelling trajectory corrected by the trajectory correcting section 15, wherein if the travelling trajectory determined by the error evaluating section has an error which is larger than a threshold, the reference point acquiring section 13A adds the reference point R as a new reference point e.g. between the reference points P and Q, and wherein the deviation amount calculating section 14A calculates a deviation amount between the absolute position for the aerial photograph and the absolute position for the point cloud included in the point cloud data, the absolute positions for the aerial photograph and the point cloud corresponding to the reference point R. Then, the trajectory correcting section 15 corrects the trajectory between the reference points P and R based on the deviation amount for the reference point R and the deviation amount for the reference point P calculated by the deviation amount calculating section 14A. In this manner, even when for example the deviation amount for the reference point P and/or Q is so large that a sufficient accuracy cannot be ensured by correction, a further correction can be performed for obtain a better accuracy.

Although the first to third exemplary embodiments as described above show that the point cloud information acquiring section is configured to acquire the sensor information and the information about the absolute position and to generate point cloud information, these processes may be divided into three blocks, i.e. a block for acquiring the sensor information, a block for acquiring the information about the absolute position, and a block for generating the point cloud information.

Exemplary Embodiment 4

Next, an information processing device according to a fourth exemplary embodiment of the present invention will be described with reference to FIGS. 10 to 12. Here, for the same parts as those in the first to third exemplary embodiments, the same reference signs are used and the corresponding description will be omitted.

The present exemplary embodiment applies for updating for cases where the point cloud corrected by the method according to one of the first to third exemplary embodiments has a reduced accuracy e.g. due to variation in a road surface condition etc. because of road construction or others, or for regular updating due to its interval.

Figure 10:
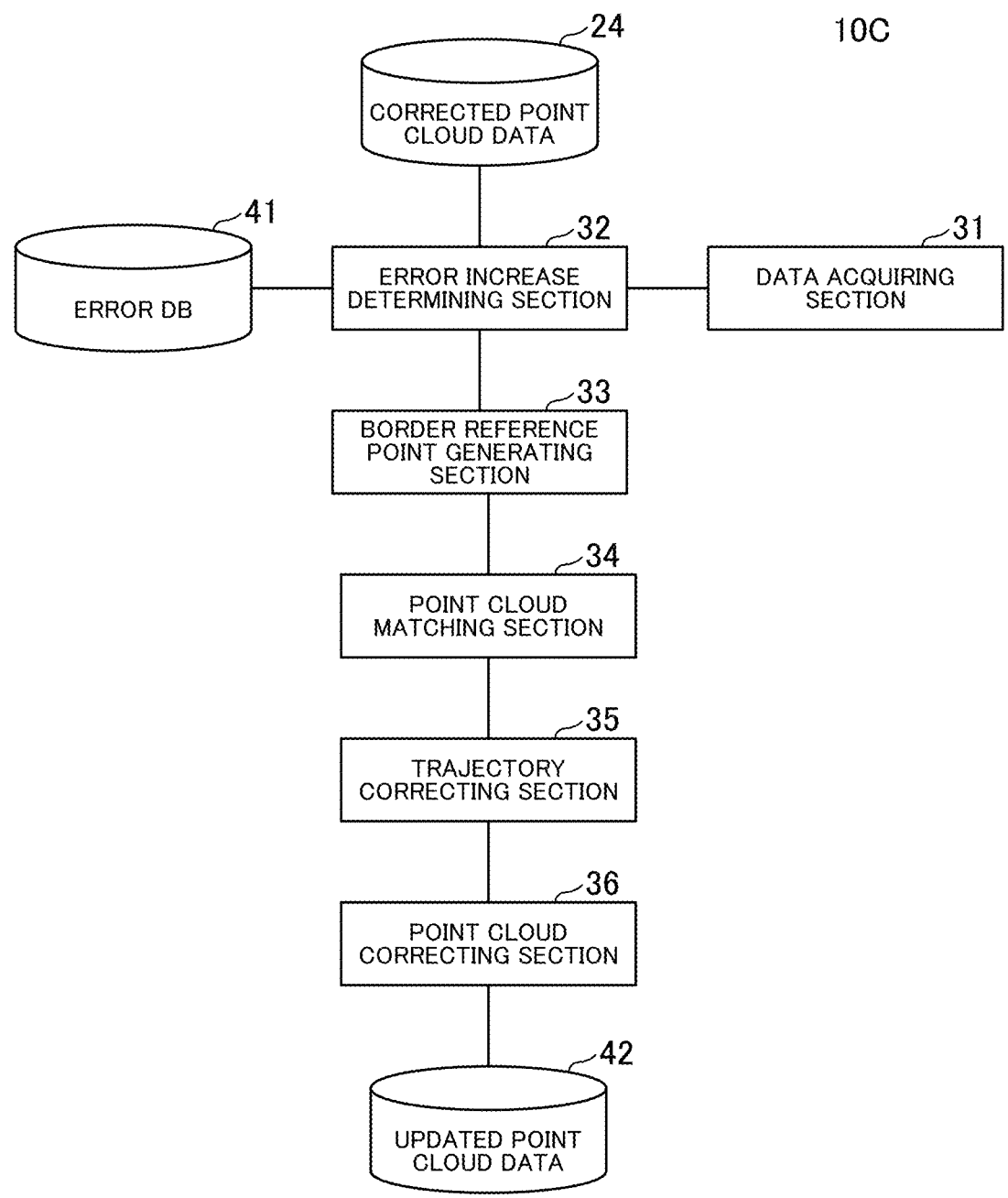
FIG. 10 is a functional diagram of a server device according to a fourth exemplary embodiment of the present invention.

FIG. 10 shows a functional diagram of a server device 10C as the information processing device according to the present exemplary embodiment. The server device 10C includes a data acquiring section 31, an error increase determining section 32, a border reference point generating section 33, a point cloud matching section 34, a trajectory correcting section 35, and a point cloud correcting section 36. Similarly to the first to third exemplary embodiments, these functions are accomplished by executing a program (information processing program) in a CPU provided in the server device 10C, wherein the program is stored in a storage device provided in the server device 10C, such as a hard disk.

The server device 10C further stores corrected point cloud data 24, an error DB 41, and updated point cloud data 42. The corrected point cloud data 24 as first point cloud information is point cloud data corrected according to the method as described above with reference to the first exemplary embodiment (see FIG. 2). The corrected point cloud data 24 includes information about a reference point which has been used during generating the data. The information about the reference point is not limited to an absolute position of the reference point, but may be also information representative of a characteristic spot (e.g. a corner of an intersection) on a map which represents the reference point.

The error DB 41 is a database which stores a current accuracy for the corrected point cloud data 24 for each of predetermined areas. It is to be noted that in case where an aerial photograph data with the same accuracy for all areas has been used for performing the correction, it may be simply accuracy information instead of a database. The updated point cloud data 42 is point cloud data having an absolute position which has been corrected (updated) in the point cloud correcting section 36 as described below.

The data acquiring section 31 acquires new sensor data and absolute position data e.g. from a vehicle V or another vehicle or another server device. Similarly to the point cloud integrating section 11, the data acquiring section 31 then generates new point cloud as second point cloud information data based on the sensor data and absolute position data. This means that the data acquiring section 31 functions as a second acquiring section configured to acquire the second point cloud information which is newer than the first point cloud information.

Since the sensor data acquired by the data acquiring section 31 or the like needs to be able to be acquired only for a predetermined range, it is not limited to a vehicle, but may be also data acquired e.g. from a LiDAR which is installed in a road shoulder zone.

The error increase determining section 32 determines based on the corrected point cloud data 24, the point cloud data acquired by the data acquiring section 31 and the error DB 41 whether the error (accuracy) of the corrected point cloud data 24 has become worse or not. This means that the error increase determining section 32 functions as a first acquiring section which acquires the first point cloud information.

Furthermore, if the error has become worse, the error increase determining section 32 instructs the border reference point generating section 33 to generate a border reference point as described below. As for a method for determining a worse error, it is determined that the error has become worse e.g. if an absolute position for a certain spot represented by the new point cloud data is outside a range which considers, for an absolute position of the same spot in the corrected point cloud data 24, an error for the position included in the error DB 41. More specifically, for example in case where a certain spot has an absolute position (X, Y) in the corrected point cloud data 24 and the same position in the error DB 41 has an error of 20 cm, it is determined that the error has become worse if an absolute position for the same spot in the new point cloud data is beyond (X±20 cm, Y±20 cm). The determination of error increase may be performed by means of a method (e.g. difference in latitude/longitude) other than the metric system. Accordingly, the error increase determining section 32 functions as a part of an updating section which performs updating based on a result of comparison between the first point cloud information and the second point cloud information.

The border reference point generating section 33 generates a border reference point in a border part between a region represented by the new point cloud data (update target region) and the existing point cloud data (corrected point cloud data 24) if it is determined in the error increase determining section 32 that the error has become worse. The border reference point will be described with reference to FIG. 11.

Figure 11:
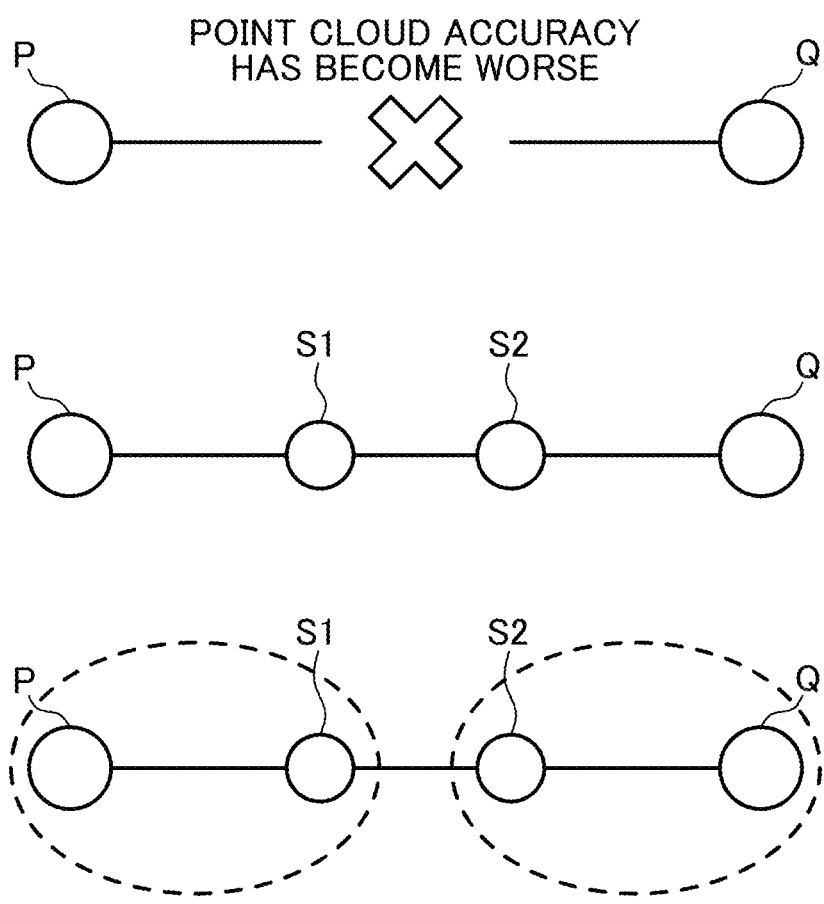
FIG. 11 is an explanatory illustration of a border reference point.
Figure 12:
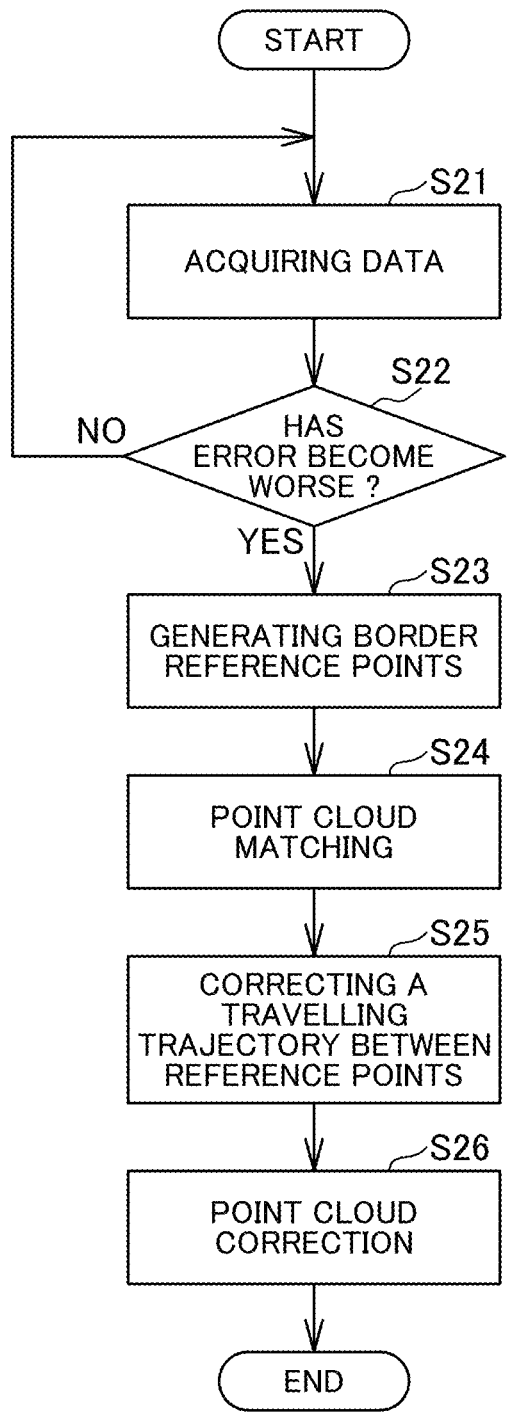
FIG. 12 is a flowchart of an information processing method in the server device according to FIG. 10.

An upper part of FIG. 11 shows that an accuracy for the point cloud data has become worse between the reference points P and Q. i.e. a region is generated which has a worse error. A middle part of FIG. 11 shows that border reference points S1 and S2 are provided (generated) in a border part between a region represented by the new point cloud data (update target region) and existing point cloud data (existing travelling trajectory). The border reference points may be defined as any spots in a border area by using an aerial photograph data as described with reference to the first to third exemplary embodiments. It is to be noted that data between the border reference points S1 and S2 are the new point cloud data (new travelling trajectory). This means that the new point cloud data are inserted without change between the border reference points S1 and S2.

The point cloud matching section 34 performs matching between existing point cloud data and new point cloud data in the border part between the existing point cloud data and the new point cloud data which includes the border reference points S1 and S2. For matching the point clouds, e.g. ICP is used to match points at a same position on a point level.

The trajectory correcting section 35 corrects a travelling trajectory between the reference point P and the border reference point S1 to which the matching has been applied in the point cloud matching section 34. Similarly, the trajectory correcting section 35 further corrects a travelling trajectory between the border reference point S2 and the reference point Q (indicated by a dashed line in a lower part of FIG. 11). This means that the trajectory correcting section 35 corrects an absolute position of a point cloud in a region which is adjacent to the update target region. According to the present exemplary embodiment, the new point cloud data result in a deviation of the absolute position for the border reference point S1 between the existing point cloud data and the new point cloud data, and therefore, the travelling trajectory is corrected based on the deviation amount, in a similar manner as the first exemplary embodiment.

The point cloud correcting section 36 corrects the absolute position for the existing point cloud data based on the travelling trajectory corrected in the trajectory correcting section 35, in order to generate the updated point cloud data 42. It is to be noted that the updated point cloud data 42 may also include the travelling trajectory corrected in the trajectory correcting section 35.

As apparent from the above description, the reference point S1 (third reference point) is set on a border of a region with the reference point P (first reference point) and the reference point S2 (fourth reference point) is set on a border of a region with the reference point Q (second reference point) as new reference points, wherein the border reference point generating section 33, the point cloud matching section 34, the trajectory correcting section 35 and the point cloud correcting section 36 function as the updating section which corrects the absolute position for the point cloud between the reference point P (first reference point) and the reference point S1 (third reference point) as well as the absolute position for the point cloud between the reference point Q (second reference point) and the reference point S2 (fourth reference point).

Hereinafter, operation of the server device 10C as described above (information processing method) will be described with reference to a flowchart according to FIG. 12. First, new point cloud data is acquired in the data acquiring section 31 (step S21), and it is then determined in the error increase determining section 32 based on the corrected point cloud data 24, the point cloud data acquired in the data acquiring section 31, and the error DB 41 whether an error of the corrected point cloud data 24 has become worse or not (step S22). If the determination shows that the error has become worse (YES in step S22), the border reference point is generated in the border reference point generating section 33 (step S23). On the other hand, if the error has not become worse (NO in step S22), it returns to step S21.

After generating the border reference point, point clouds are matched between the existing point cloud data and the new point cloud data in the point cloud matching section 34

(step S24), and then, the correction is performed for the travelling trajectories between the border reference point S1 and the reference point P as well as between the border reference point S2 and the reference point Q in the trajectory correcting section 35 (step S25), wherein the matching has been applied to the border reference points S1 and S2 in the point cloud matching section 34. Then, in the point cloud correcting section 36, the absolute position for the existing point cloud data is corrected based on the travelling trajectory corrected in the trajectory correcting section 35, in order to generate the updated point cloud data 42 (step S26).

This means that the steps S21 and S22 function as second and first acquiring steps, wherein the steps S23 to S26 function as an updating step.

Although in the description of FIG. 11, only the part having a reduced point cloud accuracy is updated with the new point cloud data, data between the reference points P and Q may be updated by replacing it with the new point cloud data as long as the data between the reference points P and Q has been acquired as the new point cloud data.

Furthermore, the travelling trajectory and/or the point cloud may be corrected also between the border reference points S1 and S2 based on aerial photograph data, similarly to the first exemplary embodiment.

According to the present exemplary embodiment, the server device 10C is provided so that the error increase determining section 32 acquires the existing point cloud data including at least the information about the first reference point and the second reference point, wherein the data acquiring section 31 acquires new point cloud information. Then, it is determined in the error increase determining section 32 whether the error has become worse or not, the border reference point is generated on a border of the update target region in the border reference point generating section, and matching is performed between the existing point cloud and the new point cloud for the border reference point in the point cloud matching section 34. And then, the travelling trajectory between the border reference point and the existing reference point is corrected in the trajectory correcting section 35, and the point cloud is corrected based on the correction of the travelling trajectory in the point cloud correcting section 36. In this manner, it is possible to update the point cloud by means of the reference point as a reference. Therefore, it is possible to update only a region which requires updating, without updating a wide range, such as replacing the whole point cloud together.

Further, updating with the new point cloud data is performed if as a result of the comparison between the existing point cloud data and the new point cloud data, it is determined by the error increase determining section 32 that the error has become worse. In this manner, it is possible to detect that a difference between the existing point cloud data and the new point cloud data is large, so that the corresponding updating can be performed.

Furthermore, the updating section defines the border reference points S1 and S2 on the border of the update target region between the two reference points P and Q. and uses the reference points P and Q and the border reference points S1 and S2 as the basis to correct the travelling trajectory (absolute position) for the point cloud between the reference point P and the border reference point S1 and/or the travelling trajectory (absolute position) for the point cloud between the reference point Q and the border reference point S2. In this manner, it is possible to correct an absolute position for an region adjacent to the update target region which may be subject to affection of updating the update target region.

Moreover, the border reference point generating section inserts the new point cloud data into the update target region. In this manner, it is possible to insert the new point cloud information into the update target region for updating.

Exemplary Embodiment 5

Next, an information processing device according to a fifth exemplary embodiment of the present invention will be described with reference to FIGS. 13 and 14. Here, for the same parts as those in the first to fourth exemplary embodiments, the same reference signs are used and the corresponding description will be omitted.

Figure 13:
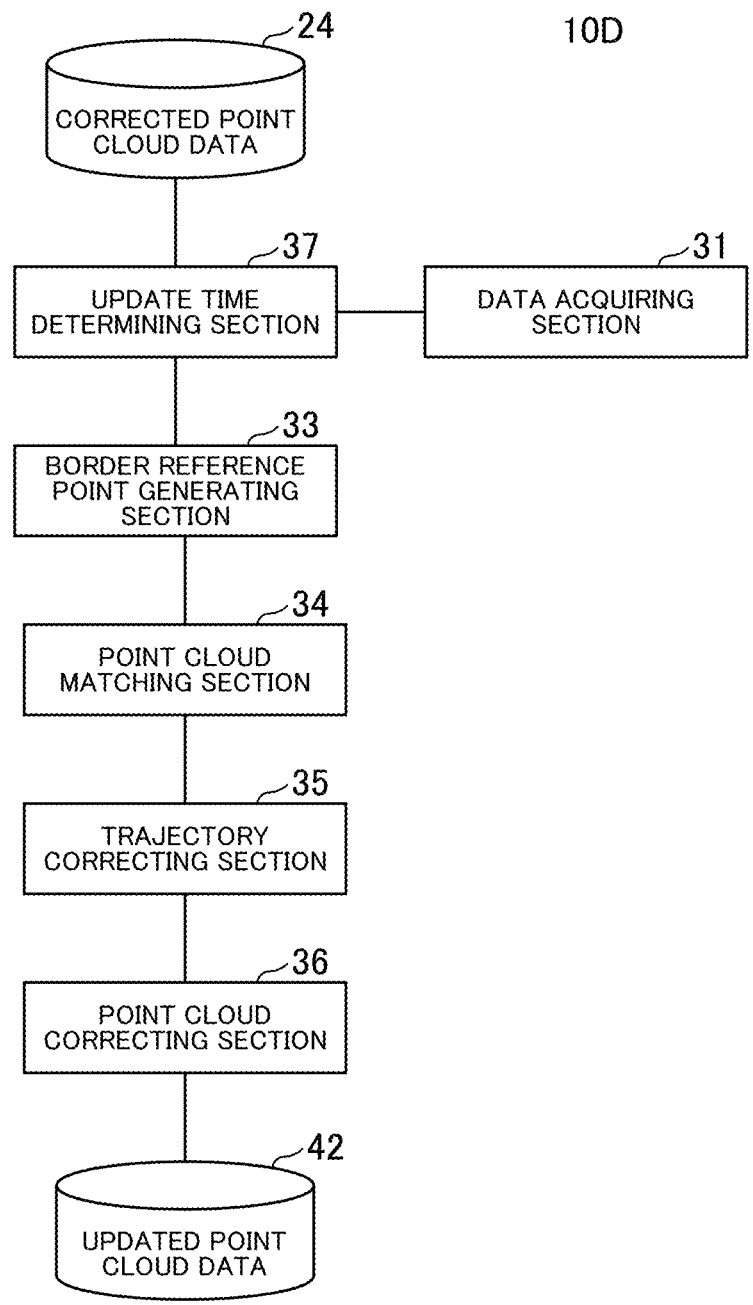
FIG. 13 is a functional diagram of a server device according to a fifth exemplary embodiment of the present invention.

FIG. 13 shows a functional diagram of a server device 10D as the information processing device according to the present exemplary embodiment. In the server device 10D according to FIG. 13, the error increase determining section 32 according to FIG. 10 is replaced with an update time determining section 37, and the error DB 41 according to FIG. 10 is omitted.

In the present exemplary embodiment, the timing for updating is not based on the fact that the error (accuracy) has become worse due to new point cloud data acquired by the data acquiring section, but the updating is performed at a predetermined time, e.g. for each month or for each season. The update time determining section 37 determines whether it is the predetermined time as described above (update time) or not, wherein if it is determined as the update time, the update time determining section 37 causes the border reference point generating section 33 and/or other sections to perform the updating. This means that the updating is performed based on the predetermined time. The process in the border reference point generating section 33 and the following sections is the same as in the fourth exemplary embodiment.

Figure 14:
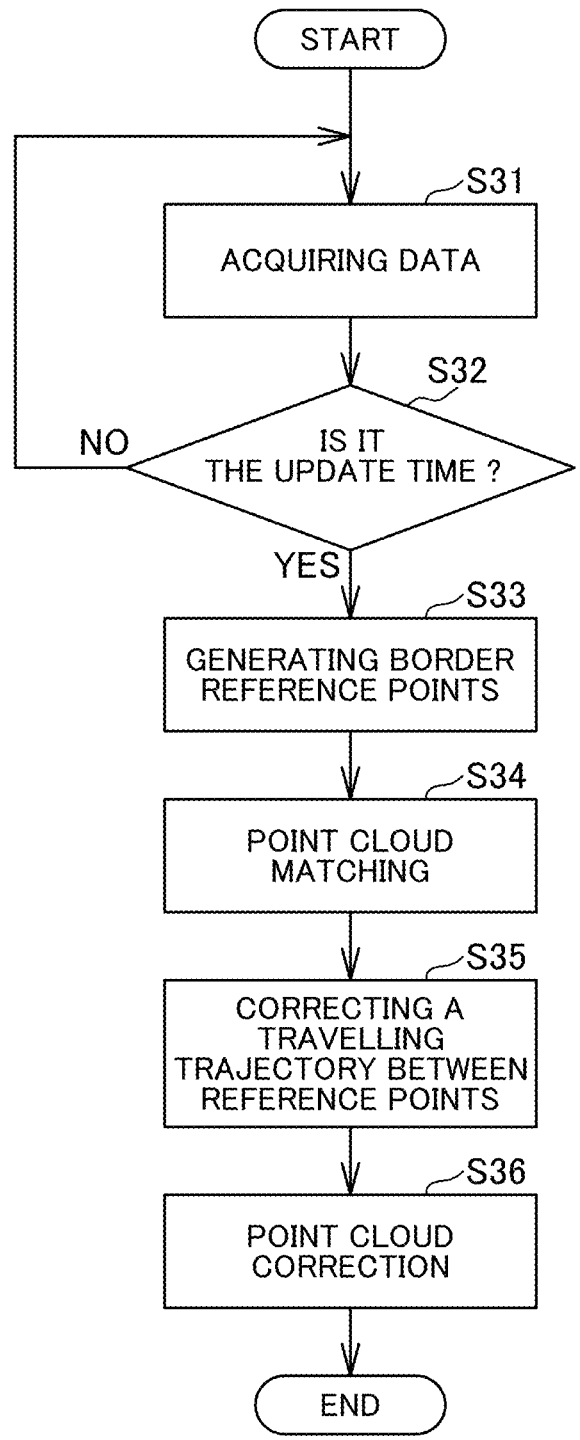
FIG. 14 is a flowchart of an information processing method in the server device according to FIG. 13.

FIG. 14 shows a flowchart of operation of the server device 10D (information processing method) according to the present exemplary embodiment. In FIG. 14, the steps S31, S33, S34, S35 and S36 are similar to the steps S21, S23, S24, S25 and S26 according to FIG. 12, respectively.

In step S32, the determination is performed by the update time determining section 37 whether it is the update time or not. If it is the update time (YES), the method proceeds to the step S33. If it is not the update time (NO), it returns to the step S31.

According to the present exemplary embodiment, since the point cloud data is updated by the update time determining section 37 based on the predetermined update time, the updating can be performed at certain times or at constant intervals.

The present invention is not limited to the exemplary embodiments as described above.

This means that the embodiments can be modified and implemented in various manners based on the conventionally known findings by those skilled in the art, within the scope which does not depart from the core of the present invention. Such modifications are also included in the scope of the present invention as long as they include an information processing device according to the present invention.

REFERENCE SIGNS LIST 10, 10A, 10B, 10C, 10D Server device (information processing device)
11 Point cloud integrating section (point cloud information acquiring section)
12 Trajectory extracting section 13 Reference point acquiring section
14 Deviation amount calculating section (bird's view information acquiring section, deviation amount calculating section)
15 Trajectory correcting section (correcting section)
16 Point cloud correcting section (correcting section)
17 Point cloud modifying section (converting section)
18 Error evaluating section (determining section)
21 Sensor data (sensor information)
22 Absolute position data (information about an absolute position)
23 Aerial photograph data (bird's view information)
24 Corrected point cloud data
31 Data acquiring section (second acquiring section)
32 Error increase determining section (first acquiring section)
33 Border reference point generating section (updating section)
34 Point cloud matching section (updating section)
35 Trajectory correcting section (updating section)
36 Point cloud correcting section (updating section)
37 Update time determining section (updating section)
41 Error DB
42 Updated point cloud data
P Reference point (first reference point)
Q Reference point (second reference point)
R Reference point (third reference point)
S1 Border reference point (third reference point)
S2 Border reference point (fourth reference point)
V Vehicle (moving body)

What is claimed is:

1. An information processing device comprising:
a point cloud information acquiring section configured to acquire point cloud information generated based on sensor information obtained by a sensor and based on information about an absolute position of a moving body at a time of acquiring the sensor information, the sensor being installed in the moving body;
a bird's view information acquiring section configured to acquire bird's view information with a bird's view on a ground surface from sky;
a calculating section configured to calculate deviation amounts between a predetermined first reference point and a predetermined second reference point, absolute positions for the bird's view information corresponding to the first reference point and the second reference point, and absolute positions for point clouds included in the point cloud information corresponding to the first reference point and the second reference point respectively; and
a correcting section configured to correct the absolute position for the point cloud included in the point cloud information based on the deviation amounts calculated by the calculating section,
wherein the correcting section is configured to correct a position for the point cloud information within a range between the first reference point and the second reference point based on the deviation amounts calculated by the calculating section.

2. The information processing device according to claim 1, wherein at least a position accuracy for the bird's view information associated with the reference point is higher than a position accuracy for the absolute position represented by the information about the absolute position.

3. The information processing device according to claim 1,
wherein the point cloud information acquiring section is configured to acquire a movement trajectory of the moving body at the time of acquiring the sensor information by the sensor as the information about the absolute position, and
wherein the correcting section is configured to correct the movement trajectory based on the deviation amount calculated by the calculating section.

4. The information processing device according to claim 1, further comprising a determining section configured to determine an accuracy of the absolute position for the point cloud information corrected by the correcting section,
wherein, if the accuracy of the absolute position determined by the determining section is lower than or equal to a predetermined accuracy, the calculating section is configured to:
add a third reference point as a new reference point between the first reference point and the second reference point; and
calculate a deviation amount between an absolute position for the bird's view information and an absolute position for the point cloud included in the point cloud information, wherein the absolute position for the bird's view information and the absolute position for the point cloud correspond to the third reference point, and
wherein the correcting section is configured to correct the absolute position for the point cloud based on the deviation amount between the third reference point calculated by the calculating section and the absolute position for the point cloud included in the point cloud information corresponding to the third reference point.

5. An information processing device comprising:
a point cloud information acquiring section configured to acquire point cloud information generated based on sensor information obtained by a sensor and based on information about an absolute position of a moving body at a time of acquiring the sensor information, the sensor being installed in the moving body;
a bird's view information acquiring section configured to acquire bird's view information with a bird's view on a ground surface from sky;
a calculating section configured to calculate a deviation amount between an absolute position for the bird's view information and an absolute position for a point cloud included in the point cloud information, wherein the absolute position for the bird's view information and the absolute position for the point cloud correspond to a predefined reference point; and
a correcting section configured to correct the absolute position for the point cloud included in the point cloud information based on the deviation amount calculated by the calculating section,
wherein the information processing device further comprises a converting section configured to convert the point cloud information acquired by the point cloud information acquiring section into image information,
wherein the bird's view information is image information,
wherein the bird's view information acquiring section is configured to acquire image information with a predetermined range including the reference point for the bird's view information, and
wherein the calculating section is configured to perform image matching between the image information with the predetermined range and the image information generated via conversion from the point cloud information in order to calculate the deviation amount between the absolute position for the bird's view information and the absolute position for the point cloud included in the point cloud information, the absolute position for the bird's view information and the absolute position for the point cloud corresponding to the reference point.

6. An information processing method intended to be performed in an information processing device, the information processing device configured to perform predetermined processes; the information processing method comprising:
a point cloud information acquiring step of acquiring point cloud information generated based on sensor information and information about an absolute position of a moving body at a time of acquiring the sensor information, wherein the sensor information is acquired by a sensor installed in the moving body;
a bird's view information acquiring step of acquiring bird's view information with a bird's view on a ground surface from sky;
a calculating step of calculating deviation amounts between a predetermined first reference point and a predetermined second reference point, absolute positions for the bird's view information corresponding to the first reference point and the second reference point, and absolute positions for point clouds included in the point cloud information corresponding to the first reference point and the second reference point respectively; and
a correcting step of correcting the absolute position for the point cloud included in the point cloud information based on the deviation amounts calculated in the calculating step,
wherein the correcting step includes correcting a position for the point cloud information within a range between the first reference point and the second reference point based on the deviation amounts calculated in the calculating step.

7. A non-volatile memory including an information processing program configured to cause a computer to perform the information processing method according to claim 6.

8. A non-volatile computer-readable storage medium comprising an information processing program stored therein, wherein the information processing program is configured to cause a computer to perform the information processing method according to claim 6.

9. An information processing device comprising:
a sensor information acquiring section configured to acquire sensor information obtained by a sensor installed in a moving body;
an absolute position information acquiring section configured to acquire information about an absolute position of the moving body at a time of acquiring the sensor information;
a point cloud information generating section configured to generate point cloud information based on the sensor information and the information about the absolute position;
a bird's view information acquiring section configured to acquire bird's view information with a bird's view on a ground surface from sky;
a calculating section configured to calculate deviation amounts between a predetermined first reference point and a predetermined second reference point, absolute positions for the bird's view information corresponding to the first reference point and the second reference point, and absolute positions for point clouds included in the point cloud information corresponding to the first reference point and the second reference point respectively; and
a correcting section configured to correct the absolute position for the point cloud included in the point cloud information based on the deviation amounts calculated by the calculating section,
wherein the correcting section is configured to correct a position for the point cloud information within a range between the first reference point and the second reference point based on the deviation amounts calculated by the calculating section.

10. An information processing method intended to be performed in an information processing device, the information processing device configured to perform predetermined processes, the information processing method comprising:
a sensor information acquiring step of acquiring sensor information obtained by a sensor installed in a moving body;
an absolute position information acquiring step of acquiring information about an absolute position of the moving body at a time of acquiring the sensor information;
a point cloud information generating step of generating point cloud information based on the sensor information and the information about the absolute position;
a bird's view information acquiring step of acquiring bird's view information with a bird's view on a ground surface from sky;
a calculating step of calculating deviation amounts between a predetermined first reference point and a predetermined second reference point, absolute positions for the bird's view information corresponding to the first reference point and the second reference point, and absolute positions for point clouds included in the point cloud information corresponding to the first reference point and the second reference point respectively; and
a correcting step of correcting the absolute position for the point cloud included in the point cloud information based on the deviation amounts calculated in the calculating step,
wherein the correcting step includes correcting a position for the point cloud information within a range between the first reference point and the second reference point based on the deviation amounts calculated in the calculating step.

11. A non-volatile memory including an information processing program configured to cause a computer to perform the information processing method according to claim 10.

12. A non-volatile computer-readable storage medium comprising an information processing program stored therein, wherein the information processing program is configured to cause a computer to perform the information processing method according to claim 10.

13. An information processing device comprising:
a sensor information acquiring section configured to acquire sensor information obtained by a sensor installed in a moving body;
an absolute position information acquiring section configured to acquire information about an absolute position of the moving body at a time of acquiring the sensor information;

a point cloud information generating section configured to generate point cloud information based on the sensor information and the information about the absolute position;
a bird's view information acquiring section configured to acquire bird's view information with a bird's view on a ground surface from sky;
a calculating section configured to calculate a deviation amount between an absolute position for the bird's view information and an absolute position for a point cloud included in the point cloud information, wherein the absolute position for the bird's view information and the absolute position for the point cloud correspond to a predefined reference point; and
a correcting section configured to correct the absolute position for the point cloud included in the point cloud information based on the deviation amount calculated by the calculating section,
wherein the information processing device further comprises a converting section configured to convert the point cloud information acquired by the point cloud information acquiring section into image information,
wherein the bird's view information is image information,
wherein the bird's view information acquiring section is configured to acquire image information with a predetermined range including the reference point for the bird's view information, and
wherein the calculating section is configured to perform image matching between the image information with the predetermined range and the image information generated via conversion from the point cloud information in order to calculate the deviation amount between the absolute position for the bird's view information and the absolute position for the point cloud included in the point cloud information, the absolute position for the bird's view information and the absolute position for the point cloud corresponding to the reference point.

14. An information processing method intended to be performed in an information processing device, the information processing device configured to perform predetermined processes; the information processing method comprising:
a point cloud information acquiring step of acquiring point cloud information generated based on sensor information and information about an absolute position of a moving body at a time of acquiring the sensor information, wherein the sensor information is acquired by a sensor installed in the moving body;
a bird's view information acquiring step of acquiring bird's view information with a bird's view on a ground surface from sky;
a calculating step of calculating a deviation amount between an absolute position for the bird's view information and an absolute position for a point cloud included in the point cloud information, wherein the absolute position for the bird's view information and the absolute position for the point cloud correspond to a predefined reference point; and
a correcting step of correcting the absolute position for the point cloud included in the point cloud information based on the deviation amount calculated in the calculating step,
wherein the information processing method further comprises a converting step of converting the point cloud information acquired in the point cloud information acquiring step into image information,
wherein the bird's view information is image information,
wherein the bird's view information acquiring step includes acquiring image information with a predetermined range including the reference point for the bird's view information, and
wherein the calculating step includes performing image matching between the image information with the predetermined range and the image information generated via conversion from the point cloud information in order to calculate the deviation amount between the absolute position for the bird's view information and the absolute position for the point cloud included in the point cloud information, the absolute position for the bird's view information and the absolute position for the point cloud corresponding to the reference point.

15. A non-volatile computer-readable storage medium comprising an information processing program stored therein, wherein the information processing program is configured to cause a computer to perform the information processing method according to claim 14.

16. An information processing method intended to be performed in an information processing device, the information processing device configured to perform predetermined processes, the information processing method comprising:
a sensor information acquiring step of acquiring sensor information obtained by a sensor installed in a moving body;
an absolute position information acquiring step of acquiring information about an absolute position of the moving body at a time of acquiring the sensor information;
a point cloud information generating step of generating point cloud information based on the sensor information and the information about the absolute position;
a bird's view information acquiring step of acquiring bird's view information with a bird's view on a ground surface from sky;
a calculating step of calculating a deviation amount between an absolute position for the bird's view information and an absolute position for a point cloud included in the point cloud information, wherein the absolute position for the bird's view information and the absolute position for the point cloud correspond to a predefined reference point; and
a correcting step of correcting the absolute position for the point cloud included in the point cloud information based on the deviation amount calculated in the calculating step,
wherein the information processing method further comprises a converting step of converting the point cloud information acquired in the point cloud information acquiring step into image information,
wherein the bird's view information is image information,
wherein the bird's view information acquiring step includes acquiring image information with a predetermined range including the reference point for the bird's view information, and
wherein the calculating step includes performing image matching between the image information with the predetermined range and the image information generated via conversion from the point cloud information in order to calculate the deviation amount between the absolute position for the bird's view information and the absolute position for the point cloud included in the point cloud information, the absolute position for the bird's view information and the absolute position for the point cloud corresponding to the reference point.

17. A non-volatile computer-readable storage medium comprising an information processing program stored therein, wherein the information processing program is configured to cause a computer to perform the information processing method according to claim 16.

* * * * *